United States Patent [19]

Rudner et al.

[11] 4,082,704

[45] Apr. 4, 1978

[54] POLYURETHANE FOAM OF INCREASED RIGIDITY

[75] Inventors: Bernard Rudner, Ridgewood; Thomas M. Noone, Little Ferry, both of N.J.

[73] Assignee: Tenneco Chemicals, Inc., Saddle Brook, N.J.

[21] Appl. No.: 702,872

[22] Filed: Jul. 6, 1976

[51] Int. Cl.² .......................... C08G 18/14; C08J 9/42
[52] U.S. Cl. ........................... 260/2.5 A; 260/2.5 BE; 264/321; 428/315; 428/425; 427/373
[58] Field of Search ....... 260/2.5 BE, 2.5 A, 2.5 AD; 264/321; 427/DIG. 9; 428/315, 425

[56] References Cited

U.S. PATENT DOCUMENTS

| 3,193,437 | 7/1965 | Schafer | 428/425 |
|---|---|---|---|
| 3,193,438 | 7/1965 | Schafer | 428/425 |
| 3,193,441 | 7/1965 | Schafer | 428/425 |
| 3,269,887 | 8/1966 | Windecker | 264/321 |
| 3,400,196 | 9/1968 | Le Roy | 428/425 |
| 3,720,574 | 3/1973 | Kunc | 428/315 |
| 3,862,291 | 1/1975 | Brandon | 264/321 |
| 3,915,783 | 10/1975 | Goppel | 428/315 |
| 3,930,919 | 1/1976 | Chant | 428/315 |
| 3,944,704 | 3/1976 | Dirks | 428/315 |
| 4,000,097 | 12/1976 | Chant | 260/2.5 A |
| 4,042,746 | 8/1977 | Hofer | 428/315 |
| 4,042,751 | 8/1977 | Roth | 260/2.5 BE |

OTHER PUBLICATIONS

Lee & Neville, *Handbook of Epoxy Resins;* McGraw-Hill; N.Y. 1967.

*Primary Examiner*—C. Warren Ivy
*Attorney, Agent, or Firm*—John Boustead; James P. Scullin

[57] ABSTRACT

The invention provides a polyurethane foam of increased rigidity.

The invention is provided by impregnating a flexible polyurethane foam with a thermosetting melamine, urea or benzoguanamine resin and a cross-linker, and then reacting the resin with the cross-linker.

10 Claims, No Drawings

POLYURETHANE FOAM OF INCREASED RIGIDITY

BACKGROUND OF THE INVENTION

Polyurethane foams can be made by reacting a polyol and a polyisocyanate in the presence of a blowing agent. When rigid but permeable to air flow, such foams can be used in a wide variety of applications, for example, in furnace air filters. Usually such foams are relatively thin, having a thickness of from 25 mil to 1.5 inches.

DETAILED DESCRIPTION OF THE INVENTION

The object of this invention is accomplished by impregnating polyurethane foam with a thermosetting melamine, urea or benzoguanamine resin, or a mixture of such resins, and a cross-linker, or mixture of cross-linkers, and then reacting the resin and the cross-linker.

Among the thermosetting melamine resins which can be used are compounds of the generic formula

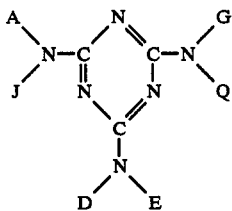
(1)

wherein A, J, D, E, Q or G can be hydrogen. However, at least one of A, J, D, E, Q and G is

wherein R and R' are hydrogen or an alkyl radical having from one to four carbon atoms and can be the same or different. Specific compounds falling within the scope of the preceding generic formula are tris-(hydroxymethyl) melamine, tris-(hydroxymethyl)-tris-(methoxymethyl) melamine, hexa-(methoxymethyl) melamine, hexa-(hydroxymethyl) melamine, monohydroxymethyl melamine, mono-(alpha-hydroxy ethyl) melamine, tris-(alpha-methoxyethyl) melamine and tetra-(alpha-hydroxy-n-propyl) melamine.

Among the thermosetting urea resins which can be used are compounds of the generic formula

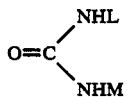
(2)

wherein L or M can be hydrogen. However, at least one or L and M is

wherein R and R' are hydrogen or an alkyl radical containing from one to four carbon atoms and can be the same or different. Specific compounds falling within the scope of the immediately preceding formula are monomethylolurea, bis-methylol urea, bis-alpha-hydroxyethyl urea, and bis-alpha-hydroxy-n-butyl urea.

Among the thermosetting benzoguanamine resins which can be used are compounds of the generic formula

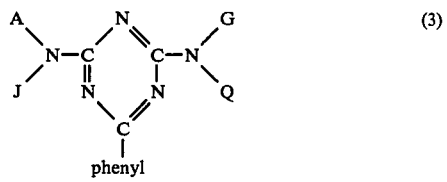
(3)

wherein A, J, G or Q can be hydrogen. Here again, however, at least one of A, J, G and Q is

wherein R and R' are hydrogen or an alkyl radical from one to four carbon atoms and can be the same or different. The thermosetting benzoguanamine resins can be prepared by the reaction of benzoguanamine and a source of formaldehyde, such as formalin or paraformaldehyde, and, if desired, can be etherified with a lower monohydric alcohol, such as methanol, ethanol or n-butanol.

In practicing the present invention, any of the known cross-linkers for melamine, urea and guanamine resins can be used. Among such cross-linkers are polycarboxylic acids which contain at least three carboxyl groups, for example, tricarballylic acid, mellitic acid, ethylene diamine tetracarboxylic acid, nitrilotriacetic acid, diethylene triamine pentaacetic acid, hydroxyethyl ethylene diamine triacetic acid, vinyl-acrylic copolymers sold, for example, by Union Carbide Corporation under the trademark Ucar, and ethylene-acrylic acid copolymers sold, for example, by The Dow Chemical Company as EEA Resin 435, EEA Resin 449, EEA Resin 455 and EEA Resin 459 containing 3.5, 8, 8 and 8, percent combined acrylic acid by weight, respectively.

Also among the cross-linkers which can be used in practicing this invention are polyanhydrides which contain at least two carboxylic acid anhydride groups per molecule. Such polyanhydrides can be monomeric, for example, benzene 1,2,4,5-tetracarboxylic acid dianhydride or benzophenone tetracarboxylic acid dianhydride or 1,4-dithiabutylenebis-(succinic anhydride), or polymeric, for example, the commercially available styrene-maleic anhydride copolymers or the ethylene maleic anhydride copolymers.

Furthermore, the cross-linker can be a polyepoxide which contains at least two epoxy groups per molecule, such as the di-glycidyl ether of bisphenol-A (for example, Epon 828 which is a proprietary condensation product of epichlorohydrin and bisphenol-A having an epoxide equivalent of 185–205 measured as grams of resin containing one gram-equivalent of epoxide) and vinylcyclohexene diepoxide. Poly(epoxymethoxy) novolaks and the Bakelite cycloalphatic epoxy resins sold by Union Carbide under the product designations ERRA-4090, ERL-4206, ERL-4221, ERL-4234 and ERL-4289 having epoxy equivalents (gm. per gm. mol oxirane oxygen) of 390–430, 70–74, 131–143, 133–154, and 205–216, respectively, are also useful cross-linkers. Essentially, any polyfunctional organic reactant known to cross-link and thermoset melamine-formaldehyde resins can be used as the cross-linker, such as amine-terminated polyamide resins, phenol, dicyandiamide and blocked polyisocyanates.

For maximum stiffness at any given impregnation level, the flexible polyurethane foam is impregnated with approximately stoichimetric quantities of thermosetting melamine, urea or guanamine resin, and cross-linker. When stoichimetric quantities are used, the impregnation is carried out using, for each

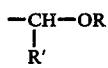

present in the melamine, urea and benzoguanamine resins used (R and R' having been previously defined), a total of carboxyl groups, epoxide groups and one-half carboxylic acid anhydride group amounting to one. It is not required, in practicing this invention, that stoichimetric quantities be used, but preferably neither the amount of resin nor the amount of cross-linker used should be in excess of 200 percent of the stoichimetric amount. Also, in order to increase the rigidity of the flexible foam, the amount of dry weight pick-up after reacting therein and cross-linker will generally be within the range from 10 to 300 weight percent, based on the weight of the polyurethane foam. Where the foam after reacting the resin and cross-linker is to be used as a filter, the dry weight pick-up should not be sufficient to impair the permeability of the foam appreciably.

The polyols suitable for use in preparing the polyurethane foam can be polyester polyols or polyether polyols, such as those made by the addition of an excess of propylene-1,2-oxide to hexane triol, trimethylolpropane, glycerol and triethanol-amine. Also, the polyols suitable for use in preparing the polyurethane foam can be a mixture of polyester polyols and polyether polyols. The polyester polyol can be prepared, for example, by reacting a dicarboxylid acid, such as adipic acid, with a mixture of a diol, such as diethylene glycol, and a triol, such as glycerol.

The polyether polyol can also be selected from any of the wide variety of polyhydric polyether compounds available and conventionally used by the art for the preparation of polyether-type polyurethanes. The most common polyether polyol compounds, the polyoxyalkylene polyether polyols, are generally prepared by the reaction of an alkylene oxide, such as propylene-1,2-oxide, with a polyhydric initiator or starter. The polyhydric initiator or starter can be, for example, glycerol, trimethylolethane or trimethylolpropane.

The alkylene oxides used in preparing the polyethers preferably are these which contain from two to four carbon atoms, for example, ethylene oxide, 1,2-propylene oxide, 1,2-butylene oxide, trimethylene oxide and tetramethylene oxide. Also useful are the poly (aralkylene ether) polyols which are derived from the corresponding aralkylene oxides such as, for example, styrene oxide, alone or mixed with an alkylene oxide. Generally, propylene oxide, i.e., the 1,2-propylene oxide, and mixtures of 1,2-propylene oxide with ethylene oxide, are preferred for the preparing of the polyether polyol reactant.

The polyethers suitable for use in preparing the polyurethane foam impregnated preferably have a molecular weight of from about 500 to about 4500 and optimally of from about 2800 to about 3800 and an average hydroxy functionality of at least 2.7 to about 3.3.

The polyester polyol reactants useful in preparing the polyurethane foam include any conventionally used in the preparation of flexible urethane polymer foams. The polyhydric polyester reactant usually has a molecular weight of at least about 400 and optimally between about 500 and about 5000. The hydroxyl number of the compound is correspondingly in the range of from about 15 to about 300. The preferred average hydroxyl functionality for the polyester resins is from about 2.2 to 2.8.

The range of polyester polyol compounds useful for preparing the polyurethane foams in the present invention is well known to the art, and the polyester polyol compounds can be prepared by, for example, the reaction of a polyhydric alcohol with a polycarboxylic acid compound, each containing from two to about 36 or more carbon atoms in the molecule. The polycarboxylic acid includes such acid precursors as the corresponding acid anhydrides or acid halides or even, for example, alkyl esters. The preferred acids are the dicarboxylic acids containing from 4 to 36 carbon atoms in the molecule. Examples of such preferred carboxylic acid compounds which can be used include, for example, aromatic acids, such as phthalic acid, terephthalic acid, isophthalic acid, tetrachlorophthalic acid, cycloaliphatic acids such as cyclohexane-1,4-diacetic acid, but especially the aliphatic acids such as tricarballylic, oxydipropionic, succinic, glutaric, adipic, azelaic, suberic and sebacic acids, hydrogenated fatty acid dimer, or combinations of such acids. The polyester polyols can also be prepared from the corresponding lactones, such as gamma-butyrolactone or epsilon-caprolactone, for example.

The polyhydric alcohol used in the preparation of the polyester polyol is generally a mixture of a dihydric and a trihydric alcohol. Preferably, a mixture of polyols, the major portion having a functionality of two and the minor a functionality of three, is used. This mixture of di- and tri-functional polyols is utilized to give an average functionality of between about 2.2 and 2.8. A functionality of greater than two is desirable to provide cross-linking in the reaction between the polyester polyol and the polyisocyanate to form a flexible, but strong foam.

It is recognized that certain compounds which are considered by those skilled in the art as polyester resins also contain ether linkages, e.g., esters prepared from dipropylene glycol. However, the primary character of such resins is considered to be that of an ester.

The organic polyisocyanates useful in the preparation of the polyurethane foam are also conventional. They contain at least two isocyanate groups per molecule. Preferably, the isocyanate mixture selected has an isocyanate functionality of from 2.0 to 3.0. The useful isocyanates are the aromatic polyisocyanates, alone or admixed with aliphatic, cycloaliphatic, or heterocyclic polyisocyanates.

The aromatic diisocyanates are generally the least expensive and most reactive polyisocyanates available. The aromatic diisocyanates, especially the toluene diisocyanate isomers, are used commercially in the preparation of foam by the one-shot, continuous slab-stock process. However, for certain purposes, other polyisocyanates, especially the aliphatic, aralkyl and cycloalkyl polyisocyanates have valuable properties and can be used, if desired, in admixture with, e.g., toluene diisocyanates. The aralkyl, aliphatic and cycloaliphatic polyisocyanates are especially useful when resistance against degradation and discoloration due to oxidation or light is needed. The non-aryl polyisocyanates are generally not useful alone, but can be used in combination with the other types for special purposes.

Suitable organic polyisocyanates include, for example, n-butylene diisocyanate, methylene diisocyanate, m-xylene diisocyanate, p-xylene diisocyanate, cyclohexyl-1, 4-diisocyanate, dicyclohexylmethane-4, 4'-diisocyanate, m-phenylene diisocyanate, p-phenylene diisocyanate, 3-(alphaisocyanatoethyl)-phenyl isocyanate, 2,6-diethylbenzene-1,4-diisocyanate, diphenyldimethylmethane-4, 4'-diisocyanate, ethylidene diisocyanate, propylene-1, 2-diisocyanate, cyclohexylene-1, 2-diisocyanate, 2,4-toluene diisocyanate, 2,6-toluene diisocyanate, 3,3'-dimethyl-4'-biphenylene diisocyanate, 3,3'-dimethoxyl-4,4'-biphenylene diisocyanate, 3,3-diphenyl-4,4'biphenylene diisocyanate, 4,4'-biphenylene diisocyanate, 3,3'-dichloro-4,4'-biphenylene diisocyanate, 1,5-naphthylene diisocyanate, isophorone diisocyanate, m-xylylene diisocyanate, triazine triisocyanate, triketotrihydrotris (isocyanatophenyl) triazine and tris (isocyanato phenyl) methane.

Generally, in carrying out the urethane polymerization reactions, the only significant groups in the reactant compounds are the isocyanate groups and active hydrogen groups which are reactive therewith. Acyclic, alicyclic, aromatic and heterocyclic radicals are all possible substituents on the active hydrogen and polyisocyanate reactants.

The preferred blowing agent for general use in the production of the polyurethane foam is water. Thus, advantages of using water are low cost and the stability which the use of water adds to the foam-making. The water-isocyanate reaction gives not only gas for blowing, but urea-containing polymer very quickly, contributing materially to early polymer strength needed to hold the gas inside, to form foam. Generally, when water is used, it is present in proportions of from about 0.5 to about 6 weight percent of water based on the total weight of the reacting polyols. Blowing agents which do not react with the isocyanate can be used as an adjunct with water or as a total replacement of water. These include compounds which are vaporized at the temperatures produced by the exotherm of the isocyanate-reactive hydrogen reaction. The various blowing agents are well known in the art and constitute no part of the present invention. Other blowing agents that are preferably used by the art include certain halogen-substituted aliphatic or cyclo-aliphatic hydrocarbons having boiling points between about $-40°$ C. and $+70°$ C., including methylene chloride; the volatile fluorocarbons, such as trichloromonofluoromethane, dichlorodifluoromethane, and 1-chloro-2-fluoroethane; low boiling hydrocarbons such as n-propane, cyclopropane, butane, isobutane, pentane, hexane, cyclohexane and their mixtures and the like.

If desired, the polyurethane foam can contain conventional fillers, flame-retardants, colorants or other materials, added during the foam making, or before, during, or after the impregnation with the thermosetting resin.

The following Examples illustrates the invention or provide comparisons with respect thereto and are to be considered not limitative of the invention.

EXAMPLES 1 TO 4

In Example 1, an impregnating mixture composed of 200 grams of a proprietary aqueous emulsion of an acrylate polymer containing two percent by weight of carboxylic acid groups, the emulsion containing 50 percent by weight of solids; 40 grams of an 80 percent aqueous solution of methoxymethyl-melamines; 50 grams of clay; 10 grams of a 50 percent by weight aqueous emulsion of tris (2,3-dibromopropyl)phosphate; 1.25 grams of pigment; and one gram of a 25 percent by weight aqueous solution of ammonium chloride was used to impregnate a sample of 20–30 pore per inch black industrial grade flexible polyurethane foam prepared using toluene diisocyanate and a polyester prepared from diethylene glycol, trimethylolpropane and adipic acid and having a molecular weight of about 2000 and a hydroxyl number of about 50. After drying for 5–6 minutes at 400° F., the pickup was 87 percent by weight.

Examples 2, 3 and 4 were repetitions of Example 1, but with pickups of 105, 170 and 200 percent by weight, respectively.

The impregnated foams of the four examples were all stiff, shiny black foams which were self-standing without bending when ⅜-inch thick and which were of essentially the same openness as the unimpregnated foams. The unimpregnated foam at ⅜-inch thickness was not self-standing, but instead was limp. In flame retardancy testing by the MVSS302 procedure, each impregnated foam ceased to burn when the flame was withdrawn and did not drip embers. In contrast, the unimpregnated foam was completely consumed by the flame when tested and dripped burning embers during that time.

EXAMPLES 5 TO 8

In Example 5, a flexible polyurethane foam sample prepared using toluene diisocyanate and a propoxylated glycerol having a molecular weight of about 3500 and a hydroxyl number of about 50 and having a size of 6-inches by 8-inches by ¼-inch was impregnated with a 10 percent by weight aqueous solution of bis-(hydroxymethyl) urea to an 80 percent by weight pickup after having been dried.

Example 6 was a repetition of Example 5, but using as the impregnant a 10 percent by weight aqueous solution of bis-(hydroxymethyl) urea containing 5 percent by weight of dispersed tris-(2,3-dichloropropyl) phosphate.

Control A was the unimpregnated foam and Control B was a repetition of Example 5, but using as the impregnant a 5 percent by weight aqueous dispersion of tris-(2,3-dichloropropyl) phosphate.

When vertically hung strips of the four foams were exposed to the tip of the flame of a cigarette lighter, Control A caught fire within 10 seconds and was completely consumed while dripping burning embers. The foam of Example 5 charred and glowed without flaming until the flame was removed but did not drip embers. The foam of Example 6 neither glowed nor flamed nor dripped. The foam of Control B glowed and dripped only as long as the flame of the cigarette lighter touched it.

After having been dried in a nitrogen oxide-rich, gas-fired oven at 400° F. for 4 minutes, Control A was less yellow than Control B, but more yellow than Example 5 or 6. Control B was badly tendered. Example 6 was stiffer than Example 5, which in turn was stiffer than Controls A and B.

Example 7 was a repeat of Example 5, except that in Example 7 the impregnant mixture also contained an equal volume of a 5 percent by weight latex prepared by diluting Hycar 2600 × 148 which is a proprietary heat reactive acrylic latex containing 50 percent by weight of solids and having a specific gravity of one, a surface tension of 38 dynes per centimeter and a Brookfield viscosity of 60 centipoises.

Example 8 was a repeat of Example 7 but using only the diluted Hycar latex. The dried foams of Examples 7 and 8 containing approximately the same dry weight pick-up as did the dried foam of Example 5. The foam of Example 7 was far stiffer than any of the others although the foam of Example 8 was stiffer than the foams of Examples 5 and 6 or the two controls. The foam of Example 7 showed about the same burn behaviour as the foam of Example 5, but the foam of Example 8 burned about like Control A foam. Only the foams of Examples 7 and 8 could be made self-standing in ¾-inch thickness, but only the foam of Example 7 was self-supporting and self-standing at ⅜-inch thickness.

EXAMPLES 9 TO 13

An aqueous mixture containing one percent by weight of a solution of tribromoneopentyl alcohol in a polyether polyol having an average molecular weight of about 3000, 2 percent by weight of tris-(hydroxymethyl) melamine and one percent by weight of bisphenol-A diglycidyl ether (dissolved in an equal weight of a 50:50 by weight mixture of water and ethanol) was used to impregnate 4-inch by 8-inch by ¼-inch strips of open flexible polyurethane foam prepared as described in Example 1. The impregnations were carried out to varying levels of pickup, where necessary by air-drying followed by further impregnation. The foam samples were given a final air-drying at room temperature overnight, and then an oven-curing for 6 minutes at 400° F.

Examples 9, 10 and 11 contained, as a result, 7 percent by dry weight, 1 percent by dry weight and 31 percent by dry weight total pickup, respectively. The foams of the three examples were about equally yellowish in appearance, but became increasingly rigid to the touch with increasing pickup.

In the vertical burning test of Example 5 and 6, none of the foams of Examples 9 to 11 flamed on exposure to the flame, none glowed or dripped when the flame was removed, but the foams of Examples 10 and 11 intumesced on continued strong heating with the flame, while the foam of Example 9 charred and glowed.

Similar strips were similarly treated with the impregnating mixture containing either no bisphenol-A diglycidyl ether (Example 12) or no tris-(hydroxymethyl) melamine (Example 13) but otherwise the same to a total dry weight pick-up of about 30%. The foams of Examples 12 and 13 looked similar to the others, but neither was as stiff to the touch, and both show more dripping embers in the burning test. Of the five foams, only the foam of Example 11 was self-standing at ¾-inch thickness, although the foam of Example 9 with 7 percent pick-up was self-standing at ½-inch thickness.

EXAMPLES 14 AND 15

In these Examples, a strip of foam was impregnated using a laboratory dip and squeeze coater provided with a pan containing a stirred quantity of impregnating mixture in which a dip roll was submerged. In the impregnating operation, the strip was passed over an idler roll, then at an angle downwardly beneath the dip roll, and then vertically between a pair of squeeze rolls positioned above the pan. The amount of pick-up could be adjusted by adjusting the gap between the squeeze rolls.

The foam impregnated was a highly open, primarily ester-resin-based foam made essentially according to the procedure of U.S. Pat. No. 3,884,848, issued May 20, 1975, naming Ricciardi, Cordora and Smudin as inventors using the following formulation in parts by weight: ester resin derived from diethylene glycol, trimethylol propane and adipic acid, 90; propoxylated glycerol, 10; toluene diisocyanate (80/20), 45.1; silicon surfactant, 3.2; stannous octoate (1:1 by weight in cresyl diphenyl phosphate, 0.45; pigment black dispersion, 3.0; n-ethyl morpholine, 0.1; triethylenediamine (33 percent by weight in dipropylene glycol), 0.4; water, 3.58; and octadecyl methacrylate, 3.0.

The impregnating composition was stirred suspension of tris-(hydroxymethyl) melamine and benzophenone tetracarboxylic acid dianhydride in a 10:3 weight ratio in a mixture of ethyl acetate and methyl ethyl ketone in a 1:1 ratio by volume.

The coater was operated in such manner that, after air-drying and oven-curing, the foam in Example 14 had a dry weight pick-up of 7 percent by weight and the foam in Example 15 had a dry weight pick-up of 40 percent by weight.

The unimpregnated foam and the impregnated foams of Examples 14 and 15 had about the same appearance. The foam of Example 14 was much firmer than the inimpregnated foam, and the foam of Example 15 was appreciably more rigid than the foam of Example 14. All three had essentially the same degree of openness, as measured by the Dow permeability apparatus, but only the foam of Example 15 was self-standing at ¾-inch thickness, although the foam of Example 14 was self-standing at one-inch thickness. The self-standing test is important because self-standing foams can be used without expensive metal frames in commercial air filters.

What is claimed is:

1. A process for the manufacture of a polyurethane foam of increased rigidity which comprises impregnating a flexible polyurethane foam with at least one thermosetting melamine, urea or benzoguanamine resin and at least one cross-linker selected from the group consisting of polycarboxylic acids which contain at least three carboxyl groups, and polyanhydrides which contain at least two carboxylic acid anhydride groups per molecule, and then reacting the resin with the cross-linker.

2. The process of claim 1 wherein the melamine resin conforms to the generic formula

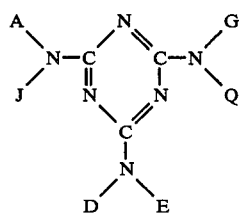

wherein A,J,D,E,Q and G are hydrogen, with the proviso that at least one of A,J,D,E,Q and G is

wherein R and R' are hydrogen or an alkyl radical containing from one to four carbon atoms.

3. The process of claim 2 wherein R is methyl and R' is hydrogen.

4. The process of claim 1 wherein the melamine resin is tris-(hydroxymethyl) melamine.

5. The process of claim 1 wherein the urea resin conforms to the generic formula

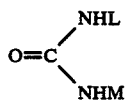

wherein L and M are hydrogen, with the proviso that at least one of L and M is

wherein R and R' are hydrogen or an alkyl radical containing from one to four carbon atoms.

6. The process of claim 5 wherein L and M are each hydroxymethyl.

7. The process of claim 1 wherein the benzoguanamine resin conforms to the generic formula

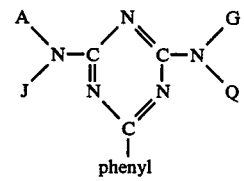

wherein A,J,G and Q are hydrogen, with the proviso that at least one of A,J,G and Q is

wherein R and R' are hydrogen or an alkyl radical containing from one to four carbon atoms.

8. The process of claim 1 wherein the cross-linker is an aqueous emulsion of an acrylate polymer containing two percent by weight of carboxylic acid groups.

9. The process of claim 1 wherein the cross-linker is benzophenone tetracarboxylic acid dianhydride.

10. The foam of increased rigidity produced in accordance with the process of claim 1.

* * * * *